United States Patent

Miya et al.

Patent Number: 5,934,321
Date of Patent: Aug. 10, 1999

[54] VALVE UNIT FOR WATER MIXING VALVE

[75] Inventors: Yukio Miya; Osamu Sugiyama; Ryota Koike; Takashi Toida, all of Tokorozawa, Japan

[73] Assignee: Citizen Watch Co., Ltd., Tokyo, Japan

[21] Appl. No.: 08/899,138

[22] Filed: Jul. 23, 1997

[30] Foreign Application Priority Data

Jul. 25, 1996 [JP] Japan ........................... 8-196178
Dec. 3, 1996 [JP] Japan ........................... 8-322633

[51] Int. Cl.⁶ ........................... F16K 3/36; F16K 11/074
[52] U.S. Cl. ........................... 137/625.41; 251/368
[58] Field of Search ........................... 251/368; 137/625.4, 137/625.17, 625.41

[56] References Cited

U.S. PATENT DOCUMENTS

| | | | |
|---|---|---|---|
| 4,724,169 | 2/1988 | Keem et al. | 427/249 |
| 4,856,758 | 8/1989 | Knapp | 251/368 |
| 4,991,822 | 2/1991 | Enke | 251/368 |
| 5,100,565 | 3/1992 | Fujiwara et al. | 251/368 |

FOREIGN PATENT DOCUMENTS

| | | |
|---|---|---|
| 4-165170 | 6/1992 | Japan . |
| 5-79069 | 3/1993 | Japan . |
| 6-227882 | 8/1994 | Japan . |
| 6-265030 | 9/1994 | Japan . |

*Primary Examiner*—John Rivell
*Assistant Examiner*—Meredith H. Schoenfeld
*Attorney, Agent, or Firm*—Armstrong, Westerman, Hattori, McLeland and Naughton

[57] ABSTRACT

In a valve unit 10 for a water mixing valve comprising a stationary disk 11 provided with a hot water inlet, a cold water inlet, and a mixed water discharge outlet, and a rotary disk 12 slidably overlapping the stationary disk, and provided with a mixing chamber, a face 11s, 12s of at least one of the stationary disk 11 and the rotary disk 12, slidable relative to the other, is provided with a hard carbon film 15 with a first intermediate layer 13a made of titanium or chromium and a second intermediate layer 13b made of silicon or silicon carbide being interposed in-between. With the valve unit constituted as above, the hard carbon film having high adhesion strength is formed on the slidable face 11s/12s of the stationary disk 11 or the rotary disk 12, or on both the slidable faces, substantially enhancing resistance-to-wear of the valve unit.

16 Claims, 8 Drawing Sheets

VALVE UNIT FOR WATER MIXING VALVE

BACKGROUND OF THE INVENTION

1. Field of the Invention

The present invention relates to a valve unit provided in a water mixing valve capable of selectively discharging either hot water at a high temperature or cold water at a low temperature, or discharging mixed water at an appropriate temperature after mixing hot water with cold water, and comprising a stationary disk and a rotary disk, each slidable against the other.

2. Description of the Related Art

A conventional type of valve unit for a water mixing valve is disclosed in, for example, Japanese Patent Laid-open Publication No. Hei 4-165170. The valve unit for the water mixing valve described therein comprises a stationary disk and a rotary disk. The stationary disk is provided with a hot water inlet, a cold water inlet, and a mixed water discharge outlet while the rotary disk is provided with a mixing chamber.

The rotary disk overlapping the stationary disk is slidably rotated so that mixed water at an appropriate temperature is prepared in the mixing chamber by regulating the flow rates of the hot water and the cold water, fed from the hot water inlet and the cold water inlet, respectively, and discharged through the mixed water discharge outlet.

In the case of the valve unit for the water mixing valve described above, a problem of slidable surfaces wearing away arises because the stationary disk and the rotary disk, in intimate contact with each other, are caused to slide each against the other. Accordingly, in the teaching of the invention disclosed in the Japanese Patent Publication referred to above, it is proposed that a hard carbon film be formed on either one or both of the slidable faces of the rotary disk and the stationary disk, making up the valve unit, in order to enhance resistance-to-wear of the valve unit.

The hard carbon film is a hydrogenated amorphous carbon film, called i-carbon film, or a diamond-like carbon film (DLC) because of its diamond-like structure and properties. Accordingly, it has high hardness, a low friction coefficient, and a good lubrication characteristic.

Enhancement in resistance-to-wear is therefore achieved by coating the slidable surfaces of the rotary disk and the stationary disk, making up the valve unit of the water mixing valve, with the hard carbon film.

However, the valve unit described above has a problem that when mounted in the water mixing valve and put to use, exfoliation of the hard carbon film from the surface of a substrate of the stationary disk or the rotary disk occurs because the valve unit is subjected to hot water at a high temperature and frequent sliding motion by a strong sliding force every time the water mixing valve is opened and closed. Thus, the water mixing valve described has a problem that it has been unable to gain high reliability for long term use.

SUMMARY OF THE INVENTION

It is a general object of this invention to provide a valve unit comprising a stationary disk and a rotary disk, at least one of which is provided with a face, slidable against a face of the other, coated with a hard carbon film strongly bonded to a substrate, with the aim of enhancing the reliability of a water mixing valve for long term use by solving the problem described above.

More specifically, the valve unit for the water mixing valve according to the invention comprises the stationary disk having a hot water inlet, a cold water inlet, and a mixed water discharge outlet, and the rotary disk overlapping the stationary disk so as to form a mixing chamber, the slidable face of at least one of the stationary disk and the rotary disk being coated with the hard carbon film via a first intermediate layer made of titanium or chromium, and a second intermediate layer made of silicon or silicon carbide.

By providing the slidable face of the stationary disk or the rotary disk, or the slidable faces of both, with the hard carbon film via the first intermediate layer made of titanium and chromium, and the second intermediate layer made of silicon or silicon carbide as described above, the first intermediate layer of titanium or chromium is formed on the substrate (ceramic material, or the like) of the stationary disk or the rotary disk, maintaining high adhesion strength.

Further, as the silicon or silicon carbide composing the second intermediate layer, and the carbon composing the hard carbon film, belong in the same IV b group of elements on the periodic table of elements, all the elements described have a diamond structure. Therefore, the second intermediate layer and the hard carbon film are bonded together with high adhesion strength due to covalent bonding. In addition, titanium or chromium composing the first intermediate layer, and silicon or silicon carbide composing the second intermediate layer have excellent adhesion strength with respect to each other in forming a coating.

With the valve unit for the water mixing valve according to the invention, exfoliation of the hard carbon film provided on the slidable face thereof does not occur even after long term use, with the result that excellent characteristics of the hard carbon film such as high mechanical strength, low friction coefficient, and high corrosion resistance are fully utilized. Thus, resistance-to-wear of the valve unit is dramatically enhanced, substantially improving the reliability of the water mixing valve for long term use.

The above and other objects, features, and advantages of the invention will be apparent from the following detailed description which is to be read in conjunction with the accompanying drawings.

DETAILED DESCRIPTION OF THE PREFERRED EMBODIMENTS

Referring now to the accompanying drawings, a preferred embodiment of this invention is hereafter described in detail.

Figure 3:
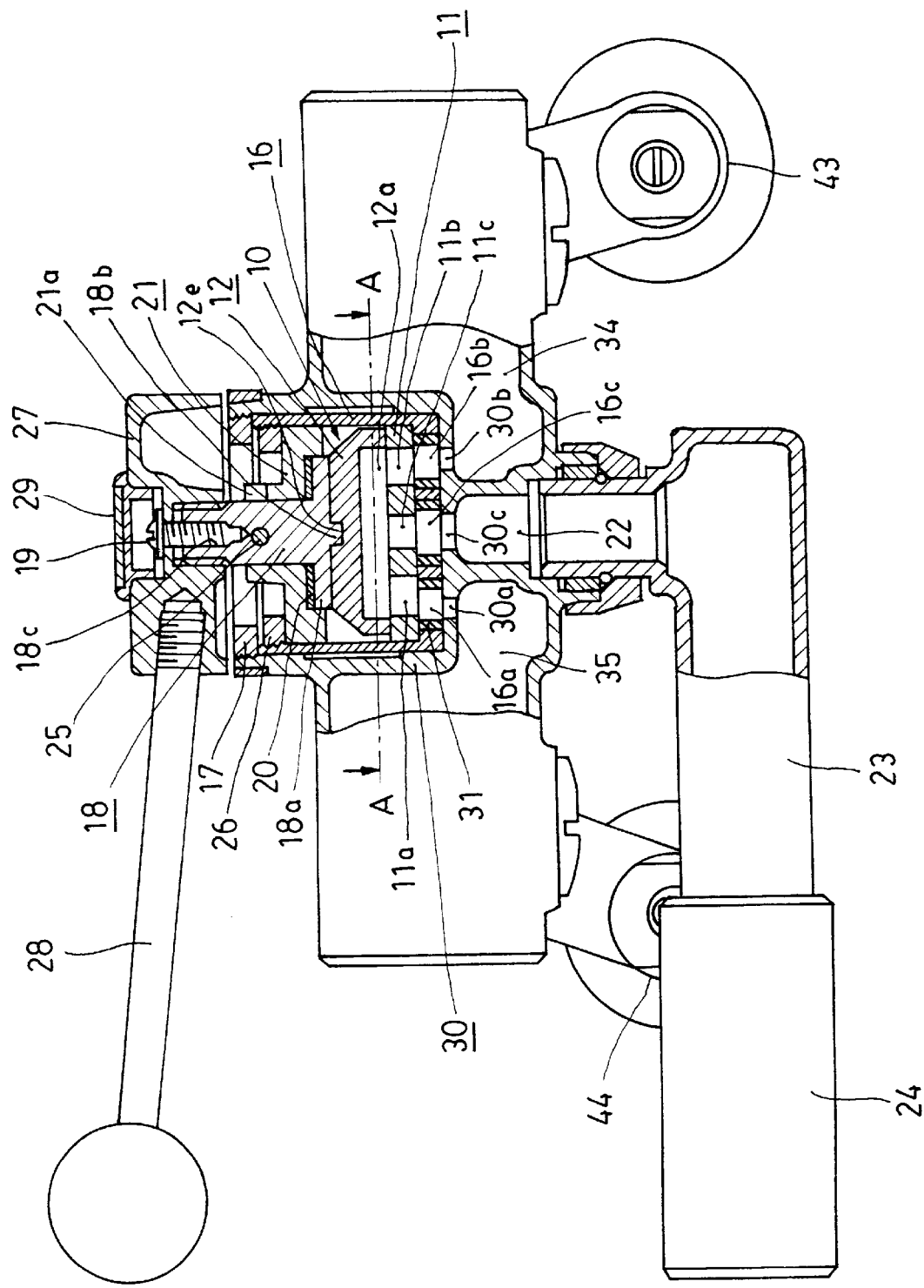
FIG. 3 is a front view, partly in cross section, of an example of a structure of a water mixing valve using the valve unit according to the invention.
Figure 4:
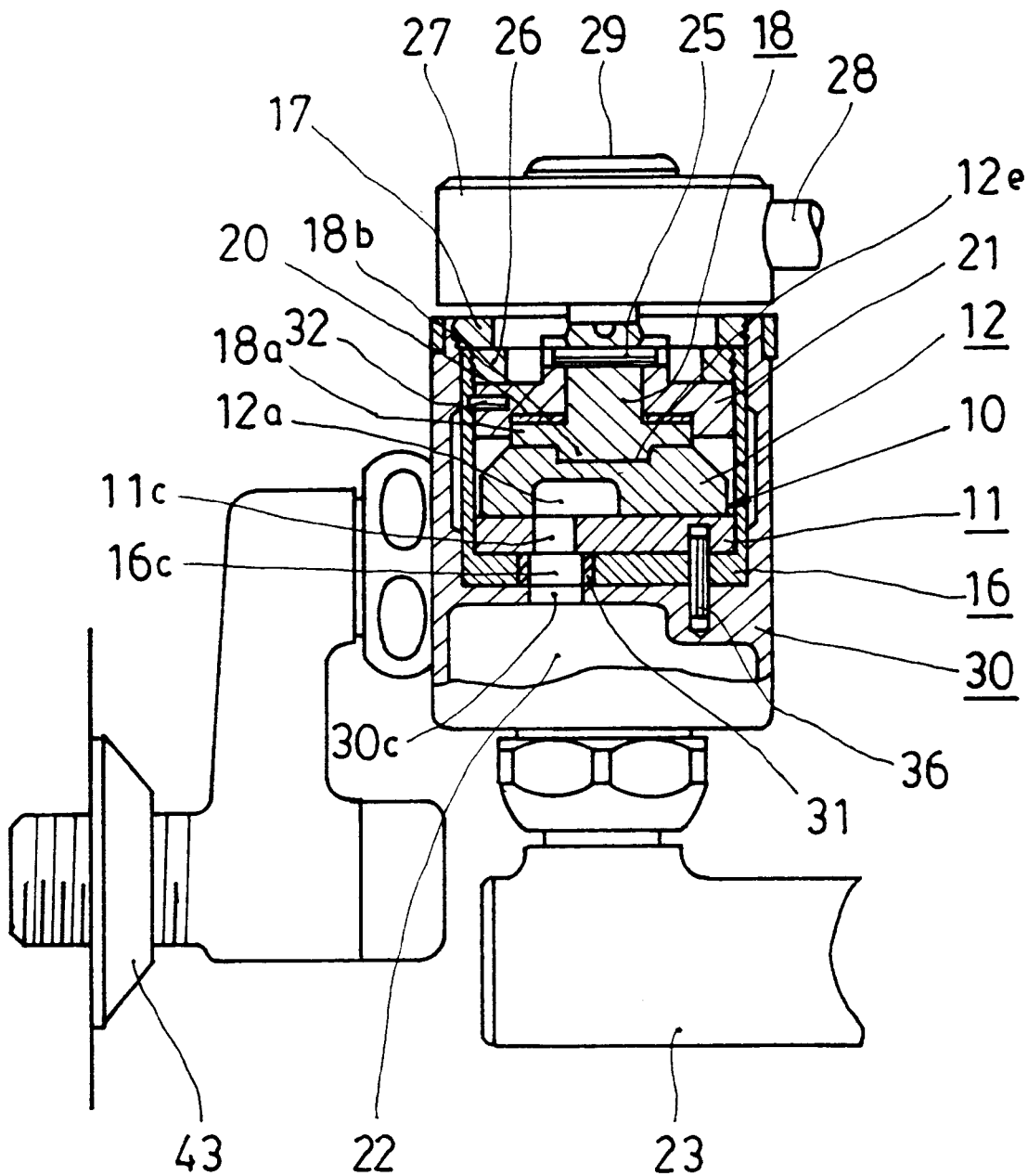
FIG. 4 is a side view, also partly in cross section, of the same.
Figure 5:
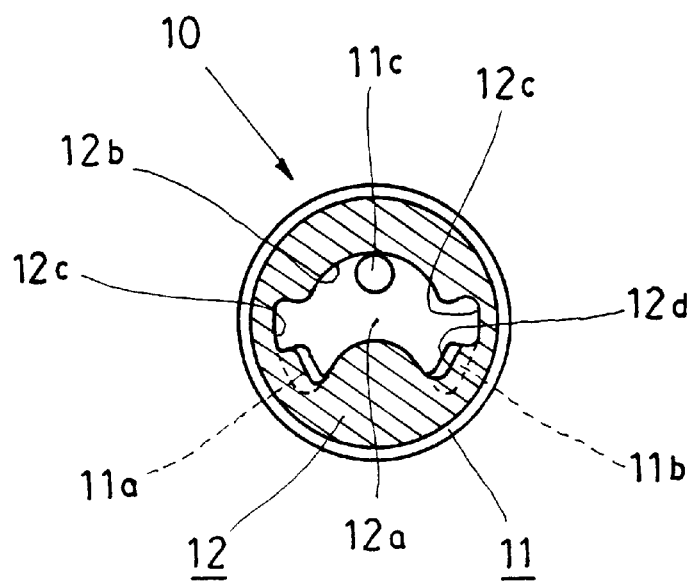
FIG. 5 is a sectional view of the valve unit only, taken on line A—A in FIG. 3.

Description of the Structure of a Mixed Water Valve: FIGS. 3, 4, and 5

At first, the structure of a water mixing valve using the valve according to the invention is described with reference to FIGS. 3 to 5, by way of example.

FIG. 3 and FIG. 4 are a front view and a side view, respectively, partly in cross section, of the water mixing valve, and FIG. 5 is a sectional view of the valve unit only, taken on line A—A in FIG. 3.

The water mixing valve is disposed at the vertex of an imaginary triangle resting on a line connecting a cold water supply source 43 with a hot water supply source 44 as the base thereof. A stationary disk 11 and a rotary disk 12, making up the valve unit 10 according to the invention, are housed in a water mixing valve body 30, and are in close vicinity of the bottom thereof.

An orifice 30a leading to a hot water passage 35, an orifice 30b leading to a cold water passage 34, and an orifice 30c leading to a mixed water discharge outlet 22 are provided on the bottom of the water mixing valve body 30. The water mixing valve body 30 has an opening at the top thereof, and a rotatable cap 27 is provided to cover the opening.

Further, a cartridge case 16 is disposed inside the water mixing valve body 30. The cartridge case 16 is in the shape of a cylinder with the bottom. And the upper end of the cartridge case 16 is pressed down by a holding ring 17 screwed into the upper end of the water mixing valve body 30, securely holding the cartridge case 16 in place so as not to allow any movement thereof inside the water mixing valve body 30.

The cartridge case 16 is provided with a hot water passing orifice 16a on the bottom in a region overlapped by the orifice 30a through which hot water is fed, a cold water passing orifice 16b on the bottom in a region overlapped by the orifice 30b through which cold water is fed, and a mixed water passing orifice 16c on the bottom in a region overlapped by the orifice 30c through which mixed water is discharged.

In addition, packings 31 are inserted around the hot water passing orifice 16a, the cold water passing orifice 16b, and the mixed water passing orifice 16c, respectively, serving for sealing the bottom of the water mixing valve body 30, the cartridge case 16, and the stationary disk 11.

The stationary disk 11 constituting the valve unit 10 is in a disk-like shape having a diameter slightly smaller than the inside diameter of the cartridge case 16, and made of a ceramic composed of alumina and zirconia material. The stationary disk 11 is housed inside the cartridge case 16 so as to overlie the bottom surface of the latter.

Furthermore, a pin 36 (refer to FIG. 4) is inserted through the stationary disk 11, the cartridge case 16, and the water mixing valve body 30 to securely hold the stationary disk 11 so that it will not be rotated relative to the water mixing valve body 30.

The stationary disk 11 is provided with a hot water inlet 11a in a region overlapping the hot water passing orifice 16a, a cold water inlet 11b in a region overlapping the cold water passing orifice 16b, and a mixed water discharge outlet 11c in a region overlapping the mixed water passing orifice 16c, respectively.

The rotary disk 12 having an outside diameter slightly smaller than that of the stationary disk 11 is disposed to overlap the stationary disk 11. The rotary disk 12 is also made of a ceramic composed of alumina and zirconia material. The stationary disk 11 and the rotary disk 12 make up the valve unit 10.

The surface roughness as denoted by Ra of the slidable faces of the stationary disk 11 and the rotary disk 12, respectively, is rendered as small as Ra=0.05 $\mu$m to 0.5 $\mu$m. In order to obtain such a small value for surface roughness, abrasive machining is applied to the slidable faces of the stationary disk 11 and the rotary disk 12, respectively.

A hard carbon film is formed on at least one of the slidable faces with a first intermediate layer and a second intermediate layer interposed therebetween, details of which are described hereafter.

It is convenient to have the valve unit 10, composed of the rotary disk 12 and the stationary disk 11, housed in the cartridge case 16 because disassembling and assembling of the water mixing valve for maintenance inspection can be done with ease simply by taking the cartridge case 16 out of the water mixing valve body 30.

The rotary disk 12 is provided with a mixing chamber 12a which opens up to either one or both of the hot water inlet 11a and the cold water inlet 11b, provided in the stationary disk 11, and discharges a fluid through the mixed water discharge outlet 11c. As shown in FIG. 5, the mixing chamber 12a of the rotary disk 12 has a curved portion 12b in the shape of a circular arc, and projections 12c, 12c, substantially in the same shape as the hot water inlet 11a and the cold water inlet 11b. Further, in close vicinity of the projections 12c, 12c, circular arc portions 12d, 12d of the radius—slightly larger than that of the curved portion 12b—are provided.

Rotation of the rotary disk 12 opens either one or both of the hot water inlet 11a and the cold water inlet 11b, allowing the hot water and/or the cold water to pass through the mixing chamber 12a. Then, the rotary disk 12 is rotated such that a cross sectional area of a pathway for the hot water inlet 11a and the same for the cold water inlet 11b are linearly varied, respectively, while maintaining a sum of the cross sectional area of the pathway for the hot water inlet 11a and the same for the cold water inlet 11b at a constant value.

A groove 12e is provided on the upper surface of the rotary disk 12, and a protrusion 18b of a circular plate 18a provided at the lower end of a spindle 18 is fitted into the groove 12e. The groove 12e is formed into a square or a hexagon in cross section, and a shape of the protrusion 18b is rendered to match the shape of the groove 12e so that the rotary disk 12 is rotated by rotation of the spindle 18.

The upper end of the spindle 18 is in mesh with an engagement portion 18c provided with splines or serrations formed inside the rotatably reciprocating lid 27. Further, a slip washer 20 made of a silicone material is interposed between the circular plate 18a of the spindle 18 and a support block 21.

A holding ring 26 is screwed onto the inner surface of the upper end of the cartridge case 16 so as to press the support block 21 and the rotary disk 12 down towards the bottom of the cartridge case 16, and to hold the same in place.

Further, a notch 21a having a predetermined angle is provided on the upper end of the support block 21. A pin stopper 25 fixedly attached to the spindle 18 is protruded into the notch 21a so as not to allow a lever handle 28 to be turned by more than a predetermined angle.

Also, the support block 21 is provided with a pin stopper 32 (refer to FIG. 4) so as to prevent the support block 21 itself from rotating, and to secure the support block 21 to the cartridge case 16.

The rotatable cap 27 is mounted so as to cover the opening on the upper surface of the water mixing valve body 30, and is integrally joined with the upper end of the spindle 18 by a setscrew 19. A lever handle 28 is fixed to the side surface of the rotatable cap 27 by screwing in. A display plate 29 giving instructions on how to operate the device is provided on the upper surface of the rotatable cap 27.

Mixed water discharged from the mixed water discharge outlet 22 flows out through a distribution cylinder 24 via a outlet metal fitting 23 rotatably attached to the water mixing valve body 30.

Figure 1:
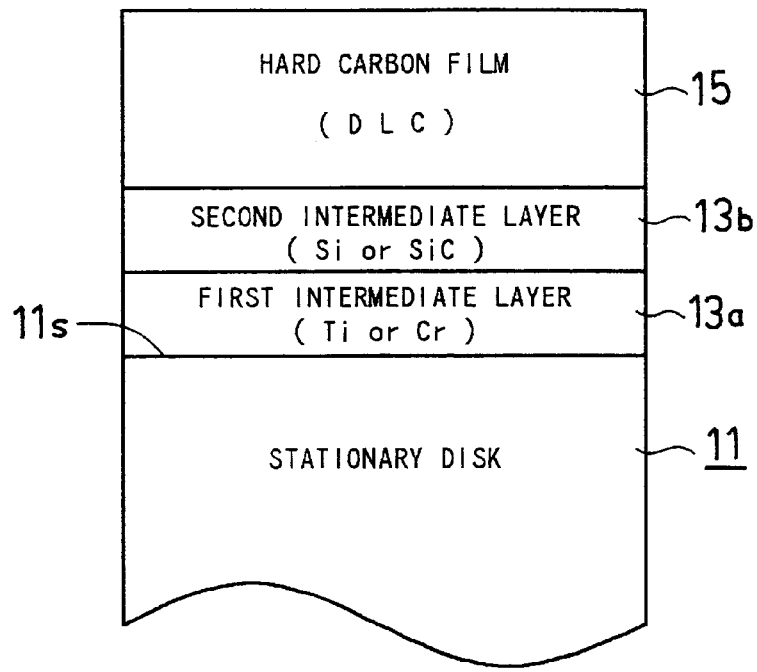
FIGS. 1 and 2 are partly enlarged schematic sectional views of a part in the vicinity of the surface of a stationary disk, and a rotary disk, respectively, making up a valve unit for a water mixing valve, according to an embodiment of the invention.
Figure 2:
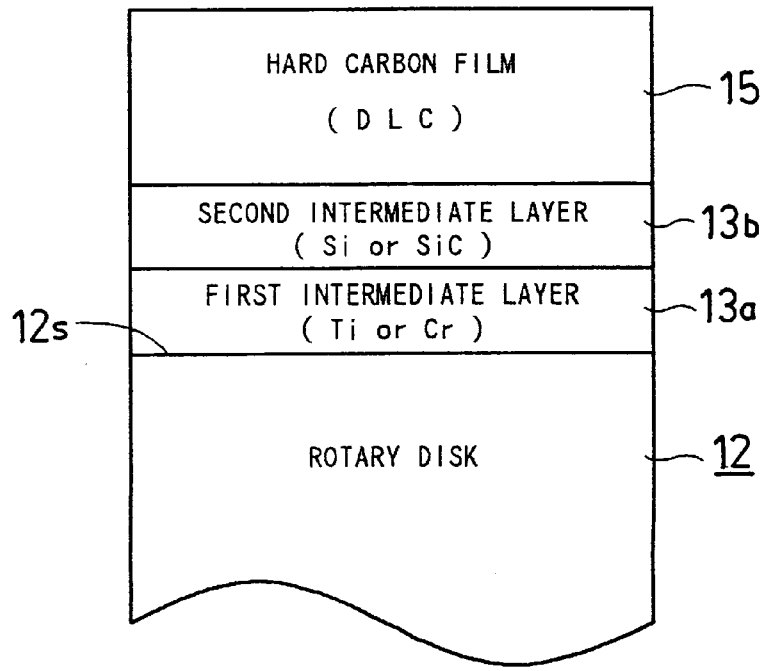

Description of a Coating Structure of Slidable Faces of the Valve Unit: FIGS. 1 and 2

The structure of the coating formed on the slidable faces of the stationary disk 11 and the rotary disk 12, respectively, making up the valve unit 10, housed in the water mixing valve mentioned above, will be described hereafter with reference to FIGS. 1 and 2.

In the case of the example shown in FIG. 1, a slidable face 11s of the stationary disk 11, relative to the rotary disk 12, is provided with a hard carbon film 15 with a first intermediate layer 13a and a second intermediate layer 13b interposed in-between. For the first intermediate layer 13a, a titanium (Ti) film is formed on a substrate of the stationary disk 11 to a thickness in the order of 0.5 $\mu$m, and for the second intermediate layer 13b formed on the first intermediate layer 13a, a silicon carbide (SiC) film is formed to a thickness in the order of 0.5 $\mu$m.

A hard carbon film 15 is formed on the second intermediate layer 13b by applying hydrogenated amorphous carbon. A thickness of the hard carbon film 15 may be adjusted depending on the usage thereof, and is generally in the range of about 1 $\mu$m to 5 $\mu$m.

Thus, the stationary disk 11, a component of the valve unit of the water mixing valve, shown in FIG. 1, has a laminate structure composed of the first intermediate layer 13a made of titanium, the second intermediate layer 13b made of silicon carbide, and the hard carbon film 15, which are formed on one above another on the substrate of the slidable face 11s.

The titanium film composing the first intermediate layer 13a is formed so as to maintain high adhesion strength, with a ceramic material such as alumina, zirconia, and the like, used in composing the stationary disk 11.

The silicon carbide film composing the second intermediate layer 13b has the following characteristics.

Specifically, silicon and carbon, composing the silicon carbide film, belong in the same IV b group of elements on the periodic table of elements, and further, the hard carbon film 15 is composed of carbon. Thus, both the silicon carbide film and the hard carbon film are composed of elements belonging in the same IV b group of elements on the periodic table of elements, and have a diamond structure. Therefore, the silicon carbide film and the hard carbon film are bonded together with high adhesion strength due to covalent bonding. In addition, the titanium film composing the first intermediate layer 13a, and the silicon carbide film composing the second intermediate layer 13b have excellent adhesion strength with each other in forming a laminate structure.

Accordingly, with the valve unit of the water mixing valve described above, the hard carbon film 15 is formed on the slidable face 11s of the stationary disk 11, relative to the rotary disk 12, with a high adhesion strength, and the phenomenon of the hard carbon film 15 exfoliating from the slidable face 11s does not occur even after long term use.

Next, in the case of an example shown in FIG. 2, a slidable face 12s of the rotary disk 12, relative to the stationary disk 11, is provided with the hard carbon film 15 with the first intermediate layer 13a and the second intermediate layer 13b interposed in-between. As in the case of the stationary disk 11 described above, for the first intermediate layer 13a, a titanium (Ti) film is formed on a substrate of the rotary disk 12 to a thickness in the order of 0.5 $\mu$m, and for the second intermediate layer 13b, a silicon carbide (SiC) film is formed to a thickness in the order of 0.5 $\mu$m. With the slidable face 12s, exactly the same effect as in the case of the slidable face 11s of the stationary disk 11 coated with the hard carbon film is attained.

Furthermore, in the case where the slidable faces 11s and 12s, slidable against each other, of the stationary disk 11 and the rotary disk 12 composing the valve unit for the water mixing valve, respectively, are provided with the hard carbon film with the first intermediate layer 13a and the second intermediate layer 13b, interposed in-between, respectively, resistance-to-wear of the slidable faces is further enhanced with the result that reliability of the water mixing valve for long term use is further enhanced.

In the embodiment of the invention described in the foregoing, the example wherein titanium is used for the first intermediate layer 13a, and silicon carbide for the second intermediate layer 13b is described. However, chromium (Cr) for the first intermediate layer 13a, and silicon for the second intermediate layer 13b may also be used.

Even in the case of such an embodiment as described, the hard carbon film 15 is formed on the substrate of the slidable face of the stationary disk 11 and/or the rotary disk 12, with high adhesion strength, similarly to the case of the preceding embodiment described in the foregoing. Accordingly, the exfoliation of the hard carbon film 15 does not occur, substantially enhancing reliability of the water mixing valve for long term use.

Hence, with reference to the example shown in FIGS. 1 and 2, there are four combinations of materials used for forming the first intermediate layer 13a and the second intermediate layer 13b. Namely: titanium and silicon, titanium and silicon carbide, chromium and silicon, and chromium and silicon carbide. Any of the combinations described may be used.

The hard carbon film 15 formed on the slidable face 11s of the stationary disk 12, and/or the slidable face 12s of the rotary disk 12, composing the valve unit of the water mixing valve according to the invention has excellent properties described below:

(1) excellent surface flatness, enabling the rotary disk 12 to be slidably rotated smoothly, relative to the stationary disk 11;

(2) low friction coefficient. The hard carbon film has a friction coefficient in the order of 0.1. Such low friction coefficient in combination with the property referred to in (1) above contributes to a reduction in rotational torque so that a lever handle can be operated smoothly and easily. Conventionally, a lubricant is applied between the rotary disk and the stationary disk, sliding against each other, to reduce rotational torque. By use of the valve unit according to the invention, rotational torque can be reduced without application of a lubricant, and the risk of the lubricant being mixed with hot water, cold water and mixed water is eliminated; and (3) high hardness. The hard carbon film has a high hardness (Vickers hardness: Hv=4000), contributing to dramatic improvement of resistance-to-wear.

Figure 6:
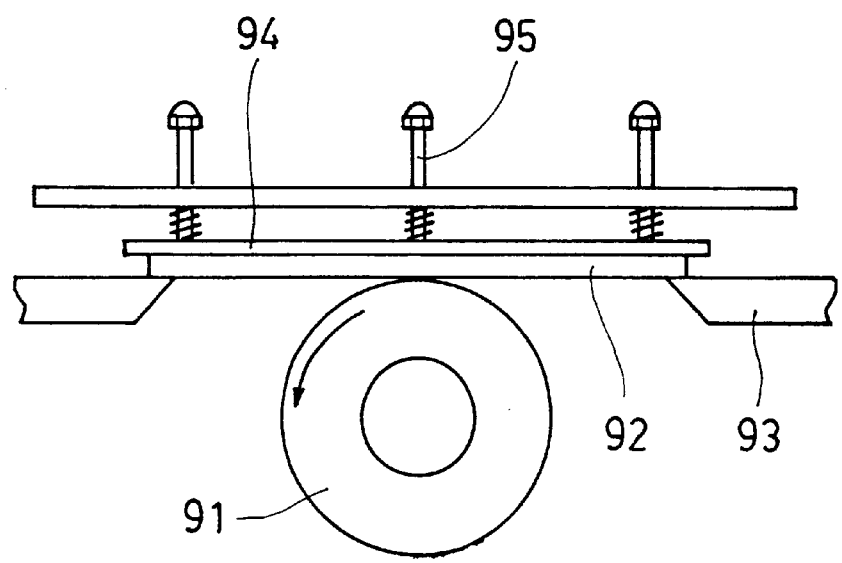
FIG. 6 is a view illustrating a method of testing resistance-to-wear of a coating by use of an abrasion test apparatus.

Evaluation of Resistance-to-Wear by Abrasion Test:
FIG. 6

Abrasion tests were conducted on testpieces provided with the same coating structure as that for the valve unit of the water mixing valve according to the invention, and a testpiece provided with same coating structure as that for a conventional valve unit, respectively, and resistance-to-wear was evaluated by comparing results of the abrasion tests.

The apparatus used in the abrasion tests was the abrasion tester manufactured by Gas Testing Instrument Co., Ltd., under the trade name of NUS—ISO—2.

Referring to FIG. 6, a method of performing an abrasion test by use of the abrasion tester is described hereafter.

As shown in FIG. 6, a testpiece 92 with its coated surface facing downward is fixedly secured to an opening of a testpiece mount 93 by a testpiece holder plate 94 and a setscrew 95. Then, an abrasive wheel 91 is pasted with an abrasive paper (not shown). An upward load is applied to the abrasive wheel 91 such that the abrasive paper is pressed to the testpiece 92 by a balance mechanism not shown.

Subsequently, the testpiece mount 93 is caused to make reciprocal motion by means of a mechanism (not shown) for converting the rotary motion of a motor into reciprocal motion, and every time the testpiece mount 93 makes one reciprocal motion, the abrasive wheel 91 is caused to rotate in the direction of the arrow by a degree of 0.9°.

As a result of such movements, the testpiece 92 is always kept in contact with a fresh region (not worn away yet) of the abrasive paper pasted on the abrasive wheel 91. The number of reciprocal motions made by the testpiece mount 93 can be set automatically, and when the set number is reached, the abrasion tester stops operation automatically.

The testpiece 92 for the abrasion test employs a substrate made of alumina ceramic, 1 mm in thickness, having a surface polished to surface roughness of Ra=0.05 $\mu$m to 0.5 $\mu$m.

As a testpiece having a coating equivalent to that of the valve unit of the invention, a testpiece (referred to as testpiece 92A) provided with a first intermediate layer made of titanium, and a second intermediate layer made of silicon carbide, both formed one above the other on the substrate to a thickness of 0.5 $\mu$m, and a hard carbon film formed to a thickness of 1.0 $\mu$m at the top was employed. As a testpiece having a coating equivalent to that of the conventional valve unit, used for comparative purposes, a testpiece (referred to as testpiece 92B) provided with a hard carbon film formed directly on the same substrate as that of the testpiece 92A described above to a thickness of 1.0 $\mu$m was employed.

Silicon carbide of mesh No. 600 was used for the abrasive paper, and the abrasion tests were conducted on the coating formed on the testpiece 92A and the same on the testpiece 92B, respectively, under conditions of contact load between the abrasive paper and the testpiece 92 at 830 g and the number of reciprocal motions of the testpiece mount 93 at 200.

Results of the abrasion tests showed that with the testpiece 92A having the coating structure according to the invention, exfoliation of the coating hardly occurred, and the surface condition of the hard carbon film did not change after testing. On the other hand, with the testpiece 92B having the conventional coating structure, exfoliation of the hard carbon film occurred to such a degree that whiteness of ceramic of the surface of the testpiece could be visually observed.

The difference in the coating structure between the testpiece 92A and the testpiece 92B is that the former has the hard carbon film formed on the surface of the substrate thereof with the first intermediate layer and the second intermediate layer interposed in-between while the latter has the hard carbon film formed directly on the surface of the substrate thereof. The results of the abrasion tests demonstrate that by providing the first intermediate layer and the second intermediate layer, the adhesion strength of the hard carbon film is increased, and the resistance-to-wear of the coating is substantially enhanced.

Figure 7:
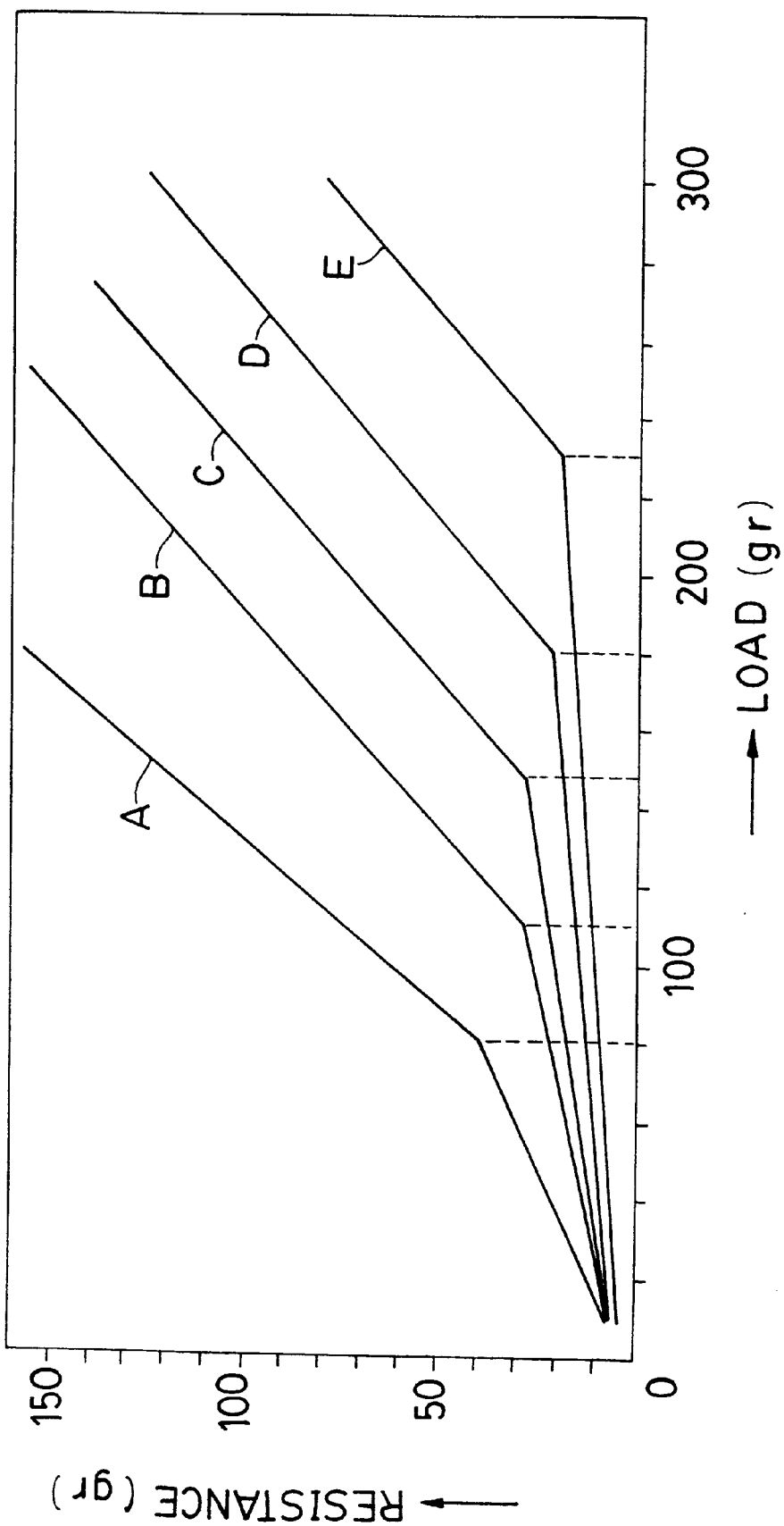
FIG. 7 is a graph showing the correlation between scratch load and scratch resistance as measured at a scratch test conducted on various testpieces having coatings equivalent to that for the valve unit according to the invention, and conventional valve units, respectively.

Evaluation of Surface Property By Scratch Test:
FIG. 7

Scratch tests were conducted on various testpieces provided with the same coating structure as that for the valve unit of the water mixing valve according to the invention, and the same coating structure as that for a conventional valve unit, respectively, and the mechanical properties (particularly, resistance-to-wear) of the coatings were evaluated. The instrument used in the scratch tests was a surface property measuring instrument of the HEIDON-14 type.

The surface property of a coating can be evaluated by measuring the resistance occurring when a testpiece is scratched in a scratch test using the surface property measuring instrument.

Five different testpieces described hereafter, denoted by (A) through (E), were prepared, and resistance occurring with these testpieces when they were scratched were measured by the surface property measuring instrument described above. Substrates of all the testpieces were made of alumina ceramic, and the surfaces thereof were polished:

(A) a testpiece with a hard carbon film (DLC) formed directly on the surface of a substrate thereof;

(B) a testpiece with a hard carbon film formed on the surface of a substrate thereof with an intermediate layer made of titanium carbide (TiC) interposed in-between;

(C) a testpiece with a hard carbon film formed on the surface of a substrate thereof with an intermediate layer made of silicon carbide (SiC) interposed in-between;

(D) a testpiece with a hard carbon film formed on the surface of a substrate thereof with a first intermediate layer of titanium (Ti) and a second intermediate layer of silicon (Si) interposed in-between; and, (E) a testpiece with a hard carbon film formed on the surface of a substrate thereof with a first intermediate layer of titanium (Ti) and a second intermediate layer of silicon carbide (SiC) interposed in-between.

The thickness of the hard carbon film (DLC) in common on all the testpieces described above was 1.0 $\mu$m, and the thickness of the intermediate layers made of titanium carbide, titanium, silicon, and silicon carbide, respectively, was 0.5 $\mu$m.

Measurement of the surface property of the respective testpieces by use of the surface property measuring instrument was performed at a scratching velocity of 30 mm/minute, and under a scratch load being varied by increments of 10 g in the range of 10 to 300 g, using a diamond indenter having a tip angle of 90° and a radius of curvature of the tip of 50 $\mu$m.

FIG. 7 is a graph showing the correlation between the scratch loads and scratch resistance values, based on the measurement results.

The graph in FIG. 7 is formed by plotting points of the scratch resistance values measured when the scratch load was increased by increments of 10 g starting from 10 g, and by joining the mean values thereof to form straight lines by approximation.

In the graph in FIG. 7, the ordinate indicates the scratch resistance value, and the abscissa the scratch load. Lines denoted by A, B, C, D, and E indicate the measurement results of the testpieces A, B. C, D, and E, respectively.

As is obvious from FIG. 7, resistance changes sharply when the scratch load increases to a certain value or above. It is deemed that such a phenomenon wherein an inflection point appears on a characteristics curve occurs when the scratch load reaches a critical load or above after a linear increase in the scratch resistance along with an increase in the scratch load because cracks are caused to occur to the coating formed on the ceramic substrate by the indenter making a mere frictional sliding motion until the scratch load reaches a scratch load value corresponding to the inflection point. Thereafter, the scratch resistance value indicates a sharp increase due to the cracks that occurred, increasing the friction coefficient.

Thus, from the critical load values corresponding to the inflection points of the characteristic curves in FIG. 7, adhesion strength of the coating on the substrate can be evaluated.

As shown in FIG. 7, the critical load for the testpiece A with the hard carbon film formed directly on the substrate, representing the conventional case, is 80 g.

On the other hand, the critical loads for the testpieces (D) and (E), of the coating structure having two intermediate layers equivalent to the embodiments of the invention, are 180 g and 230 g, respectively. This means that in the case of the valve unit of the water mixing valve according to the invention, the hard carbon film has an adhesion strength more than twice as much as that for the conventional case.

Incidentally, in the case of the testpieces (B) and (C) provided with the first intermediate layer made of titanium carbide or silicon carbide, the critical loads are 110 g and 150 g, respectively, indicating characteristics of medium magnitude.

Figure 8:
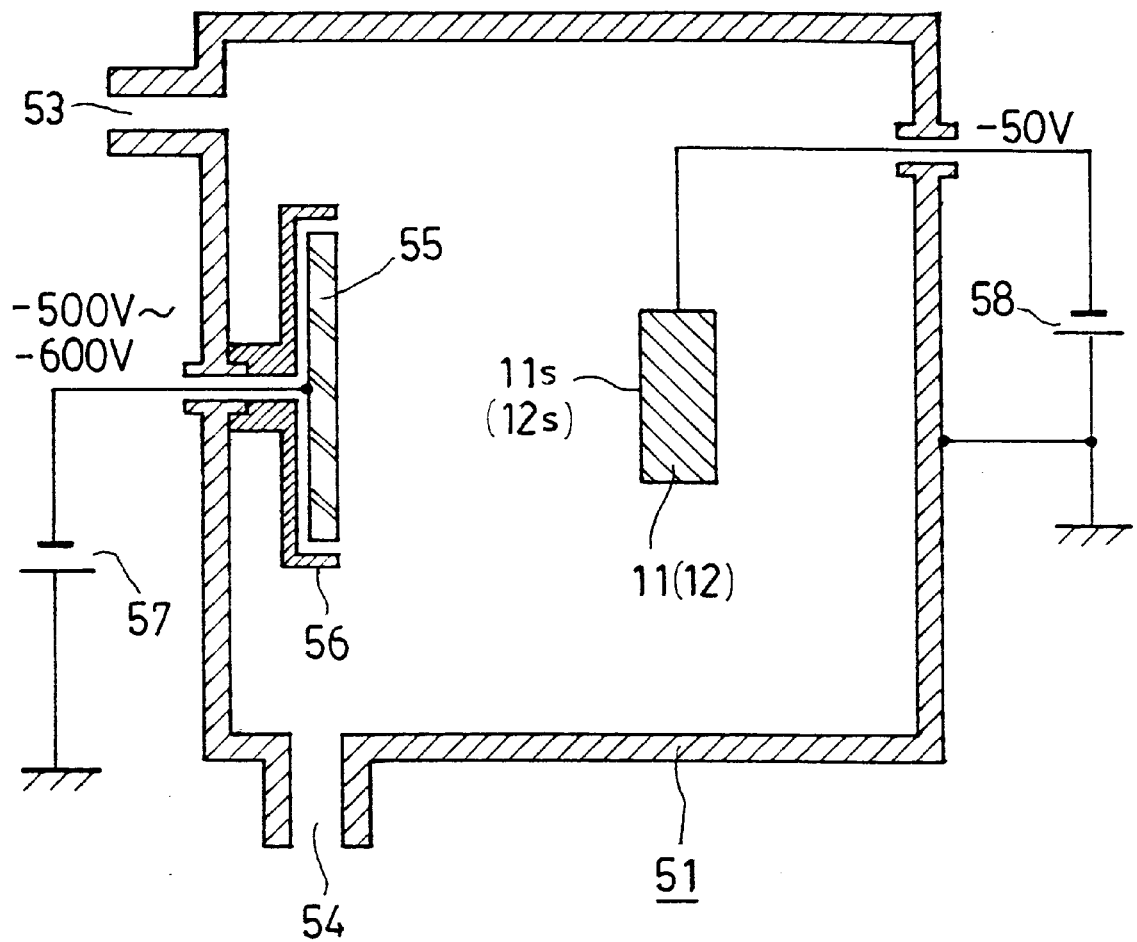
FIG. 8 is a sectional view illustrating a method of forming intermediate layers on the valve unit for the water mixing valve, according to the invention.

Description of a Method of Forming Intermediate Layers: FIG. 8

Now, description will be made hereafter of a method of forming the intermediate layers 13a and 13b on the slidable faces 11s or 12s of the stationary disk 11 or the rotary disk 12 making up the valve unit 10 of the water mixing valve according to the invention, as described with reference to FIGS. 1 through 5.

FIG. 8 is a sectional view of a sputtering system to show an example of such a method.

As shown in the figure, a target cover 56 is fixedly secured in close vicinity of the internal surface of one of the walls of a vacuum chamber 51 provided with a gas inlet 53 and an exhaust outlet 54, and a target 55 which is a material for the first intermediate layer 13a is disposed inside the target cover 56. The stationary disk 11 or the rotary disk 12 is disposed such that the slidable faces 11s or 12s on which the first intermediate layer 13a is to be formed faces the target 55. A member for holding the stationary disk 11 or the rotary disk 12, is not shown.

The stationary disk 11 or the rotary disk 12 is connected to a DC power supply source 58, and the target 55 to a target power supply source 57.

The pressure in the vacuum chamber 51 is reduced to a vacuum of $3 \times 10^{-5}$ torr or lower by evacuating through the exhaust outlet 54 by means of an evacuation method not shown.

Thereafter, argon (Ar) gas as a sputtering gas is fed into the vacuum chamber 51 through the gas inlet 53, and the degree of vacuum therein is adjusted to become $3 \times 10^{-3}$ torr.

Then, a DC voltage at −50V from the DC power supply source 58 is applied to the stationary disk 11 or the rotary disk 12, and a DC voltage in the range of −500V to −600V from the target power supply source 57 is applied to the target 55.

Thereupon, plasma is generated in the vacuum chamber 51, and ions in the plasma are sputtered onto the surface of the target 55. In the case of the target 55 being titanium, titanium molecules thrown out of the surface are adhered to the stationary disk 11 or the rotary disk 12, forming the intermediate layer 13a made of titanium on the surface (specifically, the slidable face 11s or 12s) thereof. The intermediate layer 13a comprised of a titanium film is formed to a thickness in the order of 0.5 $\mu$m.

When chromium is used for the target 55, the intermediate layer 13a comprised of a chromium film can be formed on the surface of the stationary disk 11 or the rotary disk 12.

Titanium or chromium composing the first intermediate layer 13a has good adhesion with ceramic material composing the substrate of the stationary disk 11 or the rotary disk 12.

A method of forming the second intermediate layer 13b on the first intermediate layer 13a is similar to the method of forming the first intermediate layer 13a. Then, by using an alloy material composed of silicon (Si) and carbon (C) in the ratio of 1 to 1 for the target 55, the second intermediate layer 13b comprised of a silicon carbide film can be formed to a thickness in the order of 0.5 $\mu$m on the first intermediate layer 13a formed on the surface of the stationary disk 11 or the rotary disk 12. When only silicon (Si) is used for the target 55, the second intermediate layer 13b comprised of a silicon film can be formed.

The second intermediate layer 13b made of silicon carbide or silicon has good adhesion with both the first intermediate layer 13a and the hard carbon film 15.

Besides the method of forming a coating by using the alloy material composed of silicon and carbon in the ratio of 1 to 1 for the target 55 as described in the foregoing, there is another method of forming the second intermediate layer 13b comprised of a silicon carbide film.

That is, the second intermediate layer comprised of a silicon carbide film may also be formed by a reactive sputtering method wherein the target 55 is composed of silicon (Si), and methane ($CH_4$) gas as a gas containing carbon is brought in through the gas inlet 53 so that silicon thrown out of the target 55 reacts with carbon contained in the methane gas.

Further, when forming the first intermediate layer 13a and the second intermediate layer 13b, the stationary disk 11 or the rotary disk 12 may preferably be rotated, to improve uniformity of thickness of the first intermediate layer 13a and the second intermediate layer 13b.

Figure 9:
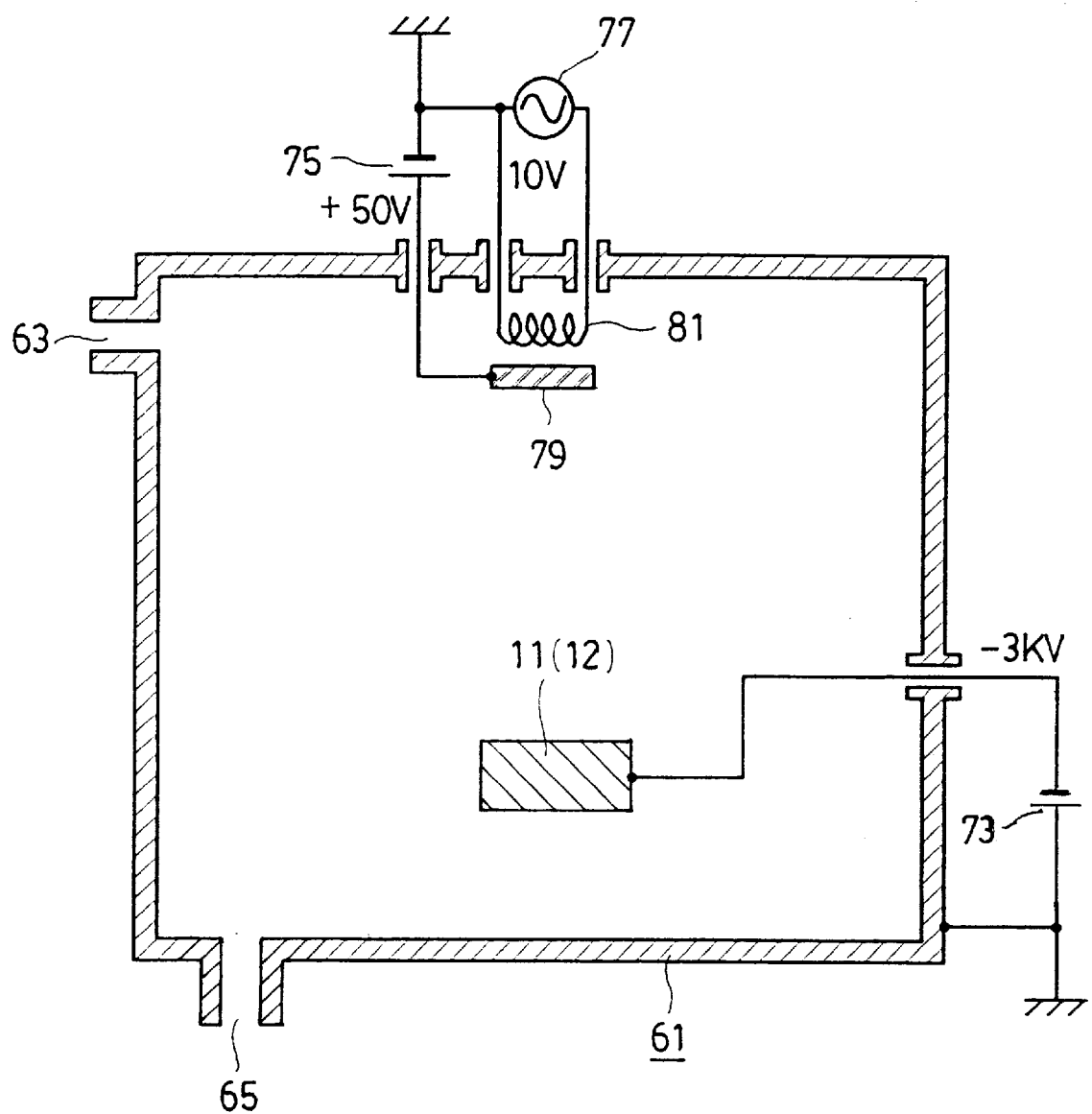
FIGS. 9 to 11 are sectional views illustrating various examples of a method of forming the hard carbon film on the valve unit for the water mixing valve, according to the invention.
Figure 10:
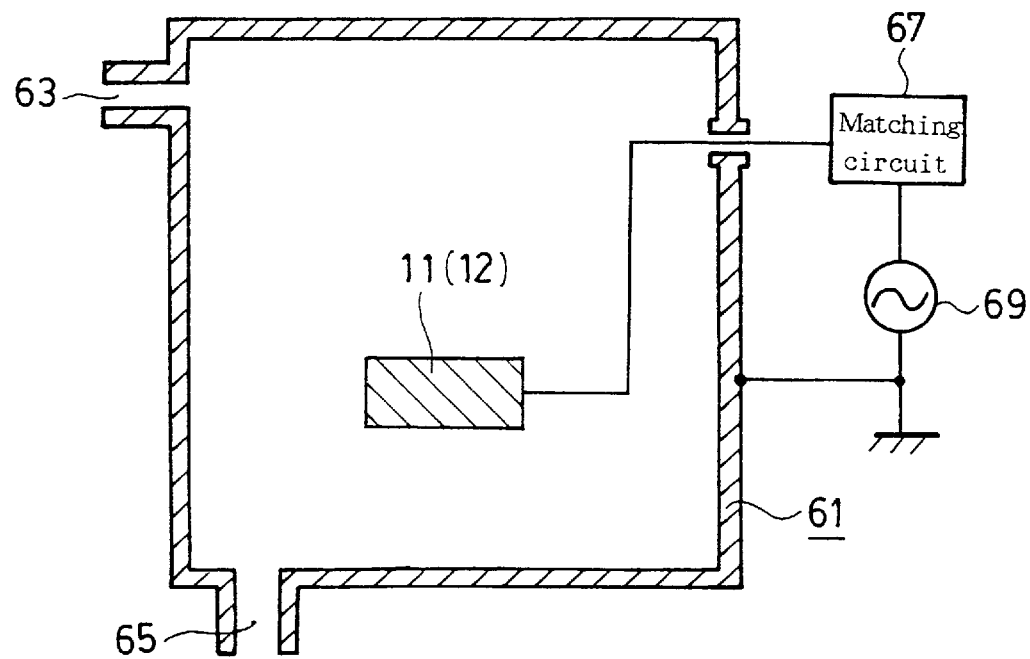
Figure 11:
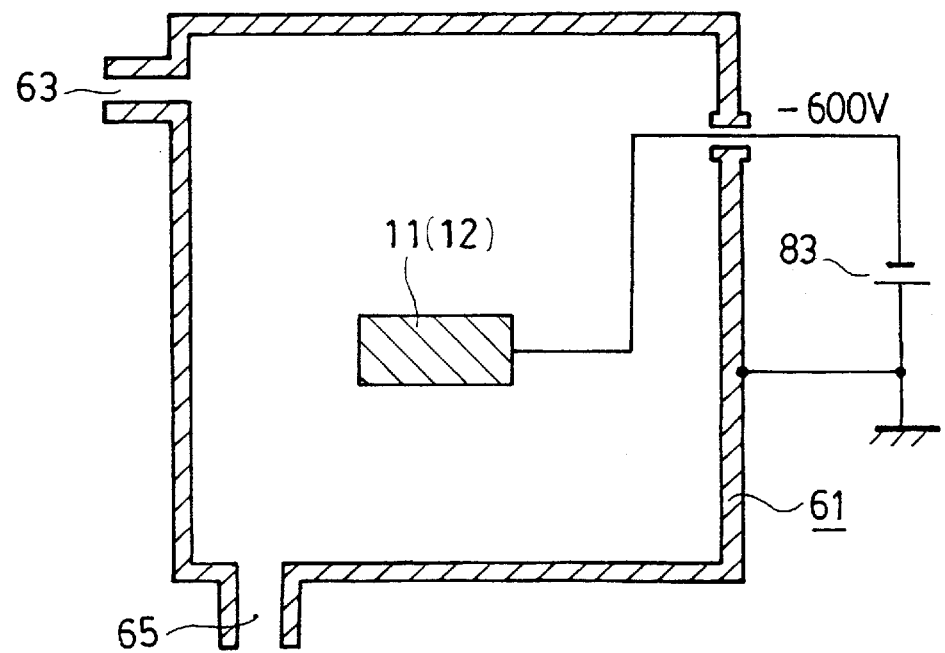

Description of a Method of Forming the Hard Carbon Film: FIGS. 9 through 11

Referring to FIGS. 9 to 11, various examples of a method of forming the hard carbon film 15 on the stationary disk 11 or the rotary disk 12, with the first intermediate layer 13a and the second intermediate layer 13b formed thereon are described hereafter. That is, there are three ways of forming the hard carbon film.

Referring to FIG. 9, a first method of forming the hard carbon film is described. FIG. 9 is a sectional view of a plasma CVD system used for such a purpose.

The first method is carried out in a vacuum chamber 61 having a gas inlet 63 and an exhaust outlet 65 and provided with an anode 79 and a filament 81 near the internal surface of the topwall thereof. The stationary disk 11 or the rotary disk 12 with the first intermediate layer 13a and the second intermediate layer 13b formed thereon is disposed inside the vacuum chamber 61. A member for holding the stationary disk 11 or the rotary disk 12, is not shown.

The pressure of the vacuum chamber 61 is reduced to a vacuum of $3\times10^{-5}$ torr or lower by evacuating through the exhaust outlet 65 by means of an evacuation method not shown.

Thereafter, benzene ($C_6H_6$) as a carbon-containing gas is fed into the vacuum chamber 61 through the gas inlet 63, and the vacuum therein is adjusted to become $5\times10^{-3}$ torr.

Then, a DC voltage from the DC power supply source 73 is applied to the stationary disk 11 or the rotary disk 12, a DC voltage from an anode power supply source 75 is applied to the anode 79, and an AC voltage from a filament power supply source 77 is applied to the filament 81.

Hereupon, the DC voltage from the DC power supply source 73, applied to the stationary disk 11 or the rotary disk 12 is set at −3 kV, the DC voltage from the anode power supply source 75, applied to the anode 79, is set at +50 v, and the AC voltage from the filament power supply source 77, applied to the filament 81, is set at 10 V to allow a flow of electric current at 30 A.

Plasma is then generated in the peripheral region of the stationary disk 11 or the rotary disk 12 disposed inside the vacuum chamber 61, and through the plasma CVD process, the hard carbon film can be formed to a thickness in the range of 1 μm to 5 μm on the second intermediary layer 13b formed on the surface (specifically, the slidable face 11s or 12s) of the stationary disk 11 or the rotary disk 12, respectively.

FIG. 10 is a sectional view of a plasma CVD system for describing another method of forming the hard carbon film.

In the case of employing the system shown in FIG. 10, the stationary disk 11 or the rotary disk 12 with the first intermediate layer 13a and the second intermediate layer 13b formed thereon is disposed inside a vacuum chamber 61 having a gas inlet 63 and an exhaust outlet 65. A member for holding the stationary disk 11 and the rotary disk 12, is not shown.

The pressure of the vacuum chamber 61 is reduced to a vacuum of $3\times10^{-5}$ torr or lower by evacuating through the exhaust outlet 65 by means of an evacuation method not shown.

Thereafter, methane ($CH_4$) gas as a carbon-containing gas is fed into the vacuum chamber 61 through the gas inlet 63, and the vacuum therein is adjusted to become 0.1 torr.

Then, radio frequency power from a radio frequency power supply source 69 at an oscillation frequency of 13.56 MHz is applied to the rotary disk 12 or the stationary disk 11 via a matching circuit 67. Hereupon, plasma is generated in the peripheral region of the stationary disk 11 and the rotary disk 12, and through the plasma CVD process, the hard carbon film can be formed on the second intermediary layer 13b formed on the surface of the stationary disk 11 or the rotary disk 12.

FIG. 11 is a sectional view of a plasma CVD system for describing still another method of forming the hard carbon film.

In the case of employing the system shown in FIG. 11, the stationary disk 11 or the rotary disk 12 with the first intermediate layer 13a and the second intermediate layer 13b formed thereon is disposed inside a vacuum chamber 61 having a gas inlet 63 and an exhaust outlet 65. A member for holding the stationary disk 11 and the rotary disk 12, is not shown.

The pressure in the vacuum chamber 61 is reduced to a vacuum of $3\times10^{-5}$ torr or lower by evacuating through the exhaust outlet 65 by means of an evacuation method not shown.

Thereafter, methane ($CH_4$) gas as a carbon-containing gas is fed into the vacuum chamber 61 through the gas inlet 63, and the vacuum therein is adjusted to become 0.1 torr.

Then, a DC voltage at −600 V from the DC power supply source 83 is applied to the stationary disk 11 or the rotary disk 12, causing generation of plasma in the peripheral region thereof. Subsequently, by use of the plasma CVD process, the hard carbon film 15 is formed on the second intermediate layer 13b formed on the surface of the stationary disk 11 or the rotary disk 12.

In forming the hard carbon film according to the methods described with reference to FIGS. 9 through 11, the examples are cited wherein methane gas or benzene gas is used as a carbon-containing gas. However, a carbon-containing gas such as ethylene other than methane, or a vapor of a carbon-containing liquid such as hexane may also be used.

Furthermore, in forming the hard carbon film according to any of the methods described with reference to FIGS. 9 through 11, the hard carbon film may preferably be formed by rotating the stationary disk 11 or the rotary disk 12 in order to improve uniformity in the film thickness.

What is claimed is:

1. A valve unit for a water mixing valve comprising:
    a stationary disk provided with a hot water inlet, a cold water inlet, and a mixed water discharge outlet;
    a rotary disk rotatable about a shaft while abutting said stationary disk and provided with a mixing chamber; and
    at least one of the faces of said stationary disk and said rotary disk, slidable relative to the other, wherein said face has a coating of a hard carbon film, and has a first intermediate layer made of titanium formed on said face and a second intermediate layer made of silicon formed on said first intermediate layer, interposed between said hard carbon film and said face.

2. A valve unit for a water mixing valve comprising:
    a stationary disk provided with a hot water inlet, a cold water inlet, and a mixed water discharge outlet;
    a rotary disk rotatable about a shaft while abutting said stationary disk and provided with a mixing chamber; and
    at least one of the faces of said stationary disk and said rotary disk, slidable relative to the other, wherein said face has a coating of a hard carbon film, and has a first intermediate layer made of chromium formed on said face and a second intermediate layer made of silicon formed on said first intermediate layer, interposed between said hard carbon film and said face.

3. A valve unit for a water mixing valve comprising:
    a stationary disk provided with a hot water inlet, a cold water inlet, and a mixed water discharge outlet;
    a rotary disk rotatable about a shaft while abutting said stationary disk and provided with a mixing chamber; and
    at least one of the faces of said stationary disk and said rotary disk, slidable relative to the other, wherein said face has a coating of a hard carbon film, and has a first intermediate layer made of titanium formed on said face and a second intermediate layer made of silicon carbide formed on said first intermediate layer, interposed between said hard carbon film and said face.

4. A valve unit for a water mixing valve comprising:

a stationary disk provided with a hot water inlet, a cold water inlet, and a mixed water discharge outlet;

a rotary disk rotatable about a shaft while abutting said stationary disk and provided with a mixing chamber; and at least one of the faces of said stationary disk and said rotary disk slidable relative to the other, wherein said face has a coating of a hard carbon film, and has a first intermediate layer made of chromium formed on said face and a second intermediate layer made of silicon carbide formed on said first intermediate layer, interposed between said hard carbon film and said face.

5. A valve unit for a water mixing valve according to claim 1, wherein said hard carbon film is formed on a face of said stationary disk, slidable relative to said rotary disk.

6. A valve unit for a water mixing valve according to claim 1, wherein said hard carbon film is formed on a face of said rotary disk, slidable relative to said stationary disk.

7. A valve unit for a water mixing valve according to claim 1, wherein said hard carbon film is formed on a face of said rotary disk and said stationary disk, respectively, slidable relative to each other.

8. A valve unit for a water mixing valve according to claim 2, wherein said hard carbon film is formed on a face of said stationary disk, slidable relative to said rotary disk.

9. A valve unit for a water mixing valve according to claim 2, wherein said hard carbon film is formed on a face of said rotary disk, slidable relative to said stationary disk.

10. A valve unit for a water mixing valve according to claim 2, wherein said hard carbon film is formed on a face of said rotary disk and said stationary disk, respectively, slidable relative to each other.

11. A valve unit for a water mixing valve according to claim 3, wherein said hard carbon film is formed on a face of said stationary disk, slidable relative to said rotary disk.

12. A valve unit for a water mixing valve according to claim 3, wherein said hard carbon film is formed on a face of said rotary disk, slidable relative to said stationary disk.

13. A valve unit for a water mixing valve according to claim 3, wherein said hard carbon film is formed on a face of said rotary disk and said stationary disk, respectively, slidable relative to each other.

14. A valve unit for a water mixing valve according to claim 4, wherein said hard carbon film is formed on a face of said stationary disk, slidable relative to said rotary disk.

15. A valve unit for a water mixing valve according to claim 4, wherein said hard carbon film is formed on a face of said rotary disk, slidable relative to said stationary disk.

16. A valve unit for a water mixing valve according to claim 4, wherein said hard carbon film is formed on a face of said rotary disk and said stationary disk, respectively, slidable relative to each other.

* * * * *